US010242669B1

(12) United States Patent
Sandler et al.

(10) Patent No.: US 10,242,669 B1
(45) Date of Patent: Mar. 26, 2019

(54) ENHANCED TRANSCRIPTION OF AUDIO DATA WITH PUNCTUATION MARKINGS BASED ON SILENCE DURATIONS

(71) Applicant: REPNOW INC., San Diego, CA (US)

(72) Inventors: Michael Sandler, San Diego, CA (US); Fredrick Korfin, San Diego, CA (US); Alexander Boone, San Diego, CA (US); Stanfell Boone, Thousand Oaks, CA (US)

(73) Assignee: REPNOW INC., San Diego, CA (US)

( * ) Notice: Subject to any disclaimer, the term of this patent is extended or adjusted under 35 U.S.C. 154(b) by 0 days.

(21) Appl. No.: 16/057,627

(22) Filed: Aug. 7, 2018

(51) Int. Cl.
| | |
|---|---|
| G10L 15/26 | (2006.01) |
| G10L 15/04 | (2013.01) |
| G10L 15/19 | (2013.01) |
| G10L 25/78 | (2013.01) |
| G10L 15/22 | (2006.01) |
| G10L 15/30 | (2013.01) |
| G10L 15/18 | (2013.01) |
| G10L 15/08 | (2006.01) |

(52) U.S. Cl.
CPC .......... *G10L 15/19* (2013.01); *G10L 15/1815* (2013.01); *G10L 15/22* (2013.01); *G10L 15/30* (2013.01); *G10L 25/78* (2013.01); *G10L 2015/088* (2013.01)

(58) Field of Classification Search
CPC ................................ G10L 15/22; G10L 15/26
See application file for complete search history.

(56) References Cited

U.S. PATENT DOCUMENTS

| | | | | |
|---|---|---|---|---|
| 6,067,514 | A * | 5/2000 | Chen .................... | G06F 17/2715 704/235 |
| 8,719,004 | B2 * | 5/2014 | Sinninoff .............. | G10L 15/265 704/257 |
| 8,918,317 | B2 * | 12/2014 | Fritsch .................. | G10L 15/197 704/235 |
| 9,135,231 | B1 * | 9/2015 | Barra ...................... | G06F 17/24 |
| 2002/0069055 | A1 * | 6/2002 | Tang ....................... | G10L 15/26 704/235 |

(Continued)

OTHER PUBLICATIONS

Gravano, Agustin, Martin Jansche, and Michiel Bacchiani. "Restoring punctuation and capitalization in transcribed speech." Acoustics, Speech and Signal Processing, 2009. ICASSP 2009. IEEE International Conference on. IEEE, 2009. (Year: 2009).*

(Continued)

*Primary Examiner* — Jialong He
(74) *Attorney, Agent, or Firm* — Knobbe Martens Olson & Bear LLP

(57) ABSTRACT

A method and process for using subsequent analysis of an audio recording to improve the punctuation of a transcribed audio file that has been processed by a transcription (speech to text) service or process. Features are disclosed for assessing audio data and transcription information to enhance the punctuation or capitalization of the words detected therein. The timing information received from a service transcribing the audio may be compared with audio analysis of the original audio data to identify words likely to be associated with punctuation or capitalization. The features generate a transcript with improved semantic and syntactic accuracy over the transcript received from the transcription service.

24 Claims, 10 Drawing Sheets

(56) References Cited

U.S. PATENT DOCUMENTS

2004/0138881 A1* 7/2004 Divay ................. G06F 17/2725
704/231
2014/0350918 A1* 11/2014 Liu ......................... G06F 17/24
704/9

OTHER PUBLICATIONS

Batista, Fernando, et al. "Bilingual experiments on automatic recovery of capitalization and punctuation of automatic speech transcripts." IEEE Transactions on Audio, Speech, and Language Processing 20.2 (2012): 474-485. (Year: 2012).*

* cited by examiner

US 10,242,669 B1

ENHANCED TRANSCRIPTION OF AUDIO DATA WITH PUNCTUATION MARKINGS BASED ON SILENCE DURATIONS

BACKGROUND

There are multiple solutions in the marketplace for turning audio into text. Audio may come from a variety of sources such as recorded audio in a file or streaming audio such as for real time conversations between a service representative and a serviced party.

Solutions exist to transcribe audio into text. Some solutions are desktop packaged software, service or cloud solutions, transcription services, or personal assistant applications. However, these solutions typically rely on substantial training data, significant processing resources, or analytical assumptions to accurately transcribe utterances in the audio into text. For example, a service, such as a personal assistant, may attempt to perform short phrase recognition. This allows a quick assessment of a general concept referenced in the utterance. In this instance, punctuation is not an important aspect of the transcription as compared to identification of the conceptual intent.

For long form or free form dictation implementations, the dictation of punctuation is partially based on training the system and partially based on training the speaker to present audio in a way that can be understood by the system. Such services use the training information to make a best guess at punctuating, based on sentence structure, word order, etc.

There exists a gap between the short phase systems and the long form systems. For example, when sending recognized text through a natural language processing engine, punctuation can impact the understanding of a sentence. A single misplaced comma can change the entire sentence meaning. As an example of a sentence that can change meaning based on punctuation, consider the utterance: "For sales, press one for billing, press two for an operator, press three." Natural language processing on this sentence, as punctuated, makes it look like one is for billing and two is for an operator. The properly punctuated sentence should be: "For sales press one, for billing press two, for an operator press three." As shown by this example, a totally different meaning is achieved depending on the punctuation.

BRIEF DESCRIPTION OF THE DRAWINGS

Embodiments of various inventive features will now be described with reference to the following drawings. Throughout the drawings, the examples shown may re-use reference numbers to indicate correspondence between referenced elements. The drawings are provided to illustrate example embodiments described herein and are not intended to limit the scope of the disclosure.

DETAILED DESCRIPTION

To address these and other issues with existing transcription solutions and dynamically generate accurate transcriptions, the features described improve on punctuation by using an audio silence analysis of the original audio in comparison with the transcription results. For example, a process may begin with the submission of an audio sample for transcription. This can be a prerecorded audio file or a live audio stream. In the case of a live audio stream a local recording of the audio stream will be made for later analysis. The audio sample may be sent to the third-party source for transcription, the third-party returning the text of the transcription itself along with a word list of the transcription that includes approximate start and end times of each word in the audio stream.

A punctuation improver then analyzes the audio recording and detects occurrences of silence in the file. Silence may refer to the absence of sound or sound below a threshold. In some instances, silence may refer to periods in the audio file where no spoken words are represented (e.g., non-spoken portions of the audio data). Each silence chunk detected that is longer than a predetermined threshold is kept for further use, shorter chunks are discarded. Each remaining silence chunk is matched to the word list with word timing to find the best match for where each silence chunk begins and what word ends there. These words are marked as needing punctuation.

The marked words are punctuated with a comma if the silence chunk is shorter than a predetermined threshold, otherwise a period or question mark is used. The period or question mark is determined based on a simple word analysis of the sentence to determine whether or not it is an interrogative sentence.

Lastly, all original punctuation is stripped from the transcript and the new punctuation is applied. Then the new, modified transcript is applied. Then the new, modified transcript is transmitted to a destination device such as the device that submitted the original audio data or a device identified in a request for the transcript.

Figure 1:
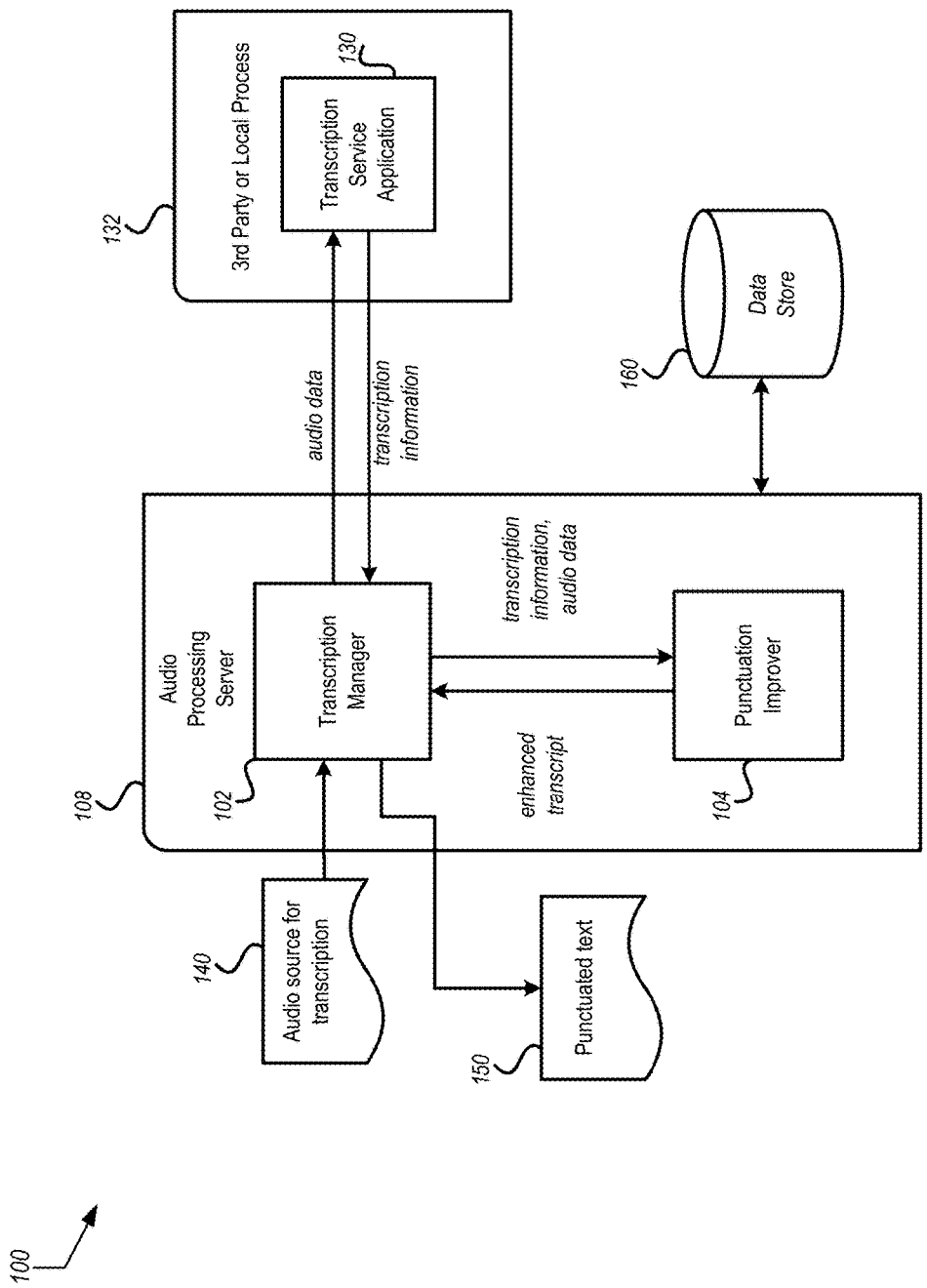
FIG. 1 is a pictorial diagram depicting an illustrative environment 100 for detecting and enhancing transcripts of audio data.

FIG. 1 is a pictorial diagram depicting an illustrative environment 100 for detecting and enhancing transcripts of audio data. The environment 100 includes a transcription manager 102 and a punctuation improver 104. The transcription manager 102 and the punctuation improver 104 may be implemented in whole or in part using processor executable instructions that cause a server 108 to perform the detection and enhancing of transcripts. The transcription manager 102 shown in FIG. 1 is also communicatively coupled with a transcription service 130. The transcription service 130 is shown in FIG. 1 as being hosted on a separate server 132 than the transcription manager 102. In some implementations, the connection between the transcription manager 102 and the transcription service 130 may include a network connection such as via the Internet or other public or private network. Examples of the transcription service 130 include Amazon Transcribe from Amazon Web Services, Inc. and Cloud Speech-to-Text from Google, Inc. In alternate implementations, the transcription service 130 may be implemented on common hardware with the transcription manager 102 (e.g., the server 108).

The transcription manager 102 includes components to receive audio data 140 representing spoken words. The audio data 140 may be included in a file or as a stream of audio data from an audio source. The audio source may be a telephone or other communication device. In some implementations, the audio source may be an audio gateway configured to manage a call between two or more parties. For example, a service may assist in establishing communications between a customer and a service provider to the customer such as an airline or utility. Examples of such a service and features included therein are described in U.S. patent application Ser. No. 15/821,579, filed Nov. 22, 2017 and entitled "AUTOMATED TELEPHONE HOST SYSTEM INTERACTION" which is commonly owned by assignee of the present application and hereby incorporated by reference in its entirety.

The transcription manager 102 may coordinate the processing of audio data to obtain transcript information for the audio data. Transcript information may include a text file representing a transcription of words detected in the audio data. The text file may also include punctuation which, as discussed above, can significantly impact the understanding of the spoken words. Transcript information may include word timings indicating when a word was detected in the audio data and, in some instances, when the word ends. Table 1 provides an example of transcription information for audio data including the utterance "Now hear this."

TABLE 1

| Text | Word timing |
| --- | --- |
| Now hear this | Now: 0.01 - 0.02<br>hear: 0.03 - 0.05<br>this: 0.06 - 0.9 |

The coordination by the transcription manager 102 may include establishing a session for audio data. For example, if the audio data is related to a user's request to contact a customer service representative, the audio data may be associated with a unique identifier to ensure the processing of the audio data may be properly correlated with a result of the processing. In some implementations, the audio data may be accompanied or include request metadata. The request metadata may include a session identifier, a source identifier indicating the source of the audio data, a destination identifier indicating where the punctuated transcript for the audio data should be transmitted, or other information related to the audio data or to assist in processing the audio data.

The coordination by the transcription manager 102 may include a queue to control the rate of processing. For example, the transcription manager 102 may receive audio data for hundreds or thousands of transactions. To ensure effective utilization of the processing resources available to the transcription manager 102, the punctuation improver 104, or the utilization of the transcription service 130, audio data may be queued and processed when adequate resources are available.

The transcription manager 102 may identify audio data to be processed by duration of the audio data, size (e.g., memory) of the audio data, quality of the audio data, source of the audio data, or other detectable aspect of the audio data, its source, or a destination for the punctuated text to be produced.

Once audio data is identified for processing, the transcription manager 102 may transmit the audio data to the transcription service 130. The transcription service 130 may provide asynchronous processing of the audio data. In such instances, the transcription manager 102 may manage requests to ensure that transcription information received from the transcription service 130 may be associated with the corresponding audio data. The coordination may include using the session identifier or other unique identifier to track requests to and responses from the transcription service 130. In some implementations, the identifier may be provided by the transcription service 130 in response to the request for transcription information. Later, when the transcription information is available, a message may be transmitted from the transcription service 130 to the transcription manager 102 including the identifier and the transcription information (or reference thereto such as a URL).

Like the queuing of audio data, the transcription information received from the transcription service 130 may be processed upon receipt or queued for processing under the control of the transcription manager 102. The transcription manager 102 may use criteria such as the availability of resources included in performing the processing, memory size of the transcription information, number of words included in the transcription information, a confidence metric for the transcription indicating how accurate the transcribed words or timings are, source of the transcription information or audio data associated therewith, or other detectable characteristic of the data or processing elements. The transcription manager 102 may use one or more of the criteria to determine which transcription information to process and when to process the identified transcription information.

Once the transcription manager 102 identifies transcription information for processing, the transcription manager 102 identifies the transcription information to the punctuation improver 104. The identification may include transmitting a message from the transcription manager 102 to the punctuation improver 104. The message may include the transcription information or information to facilitate retrieval of the transcription information (e.g., session identifier, queue element identifier, or other unique value(s)). In some implementations, the identification may include moving the transcription information to a queue of items to be processed by the punctuation improver 104.

The punctuation improver 104 may process the transcript information to generate a punctuated transcription of the audio data. As discussed, the punctuation which may be included in the transcription information received from the transcription service 130 may be inaccurate or wholly absent. Punctuation can impact the ultimate sentiment of the spoken words and as such represent an area where error can impact the ultimate analysis of the audio data. Further details of the processing of transcription information are discussed, for example, with reference to FIG. 2 below.

The punctuation improver 104 may return the punctuated text transcript 150 or information to access the punctuated text transcript (e.g., filename, URL, record identifier, or the like) to the transcription manager 102. The transcription manager 102 may then identify a destination for the punctuated transcript. The identification may be based on, for example, the original request or the audio data used to generate the transcription information. The transcription manager 102 may then transmit the punctuated text transcript to the destination. In some implementations, it may be desirable to transmit a message to the destination indicating the availability of the transcript and allow the destination device to request the transcript when ready to process. For example, a callback machine interface may be implemented at the destination to receive a URL for an endpoint which, when accessed, will return the transcript.

The audio processing server 108 may be communicatively coupled with a data store 160. The data store 160 may include memory or other persistent storage medium to support the generation of the punctuated text transcript 150.

Figure 2:
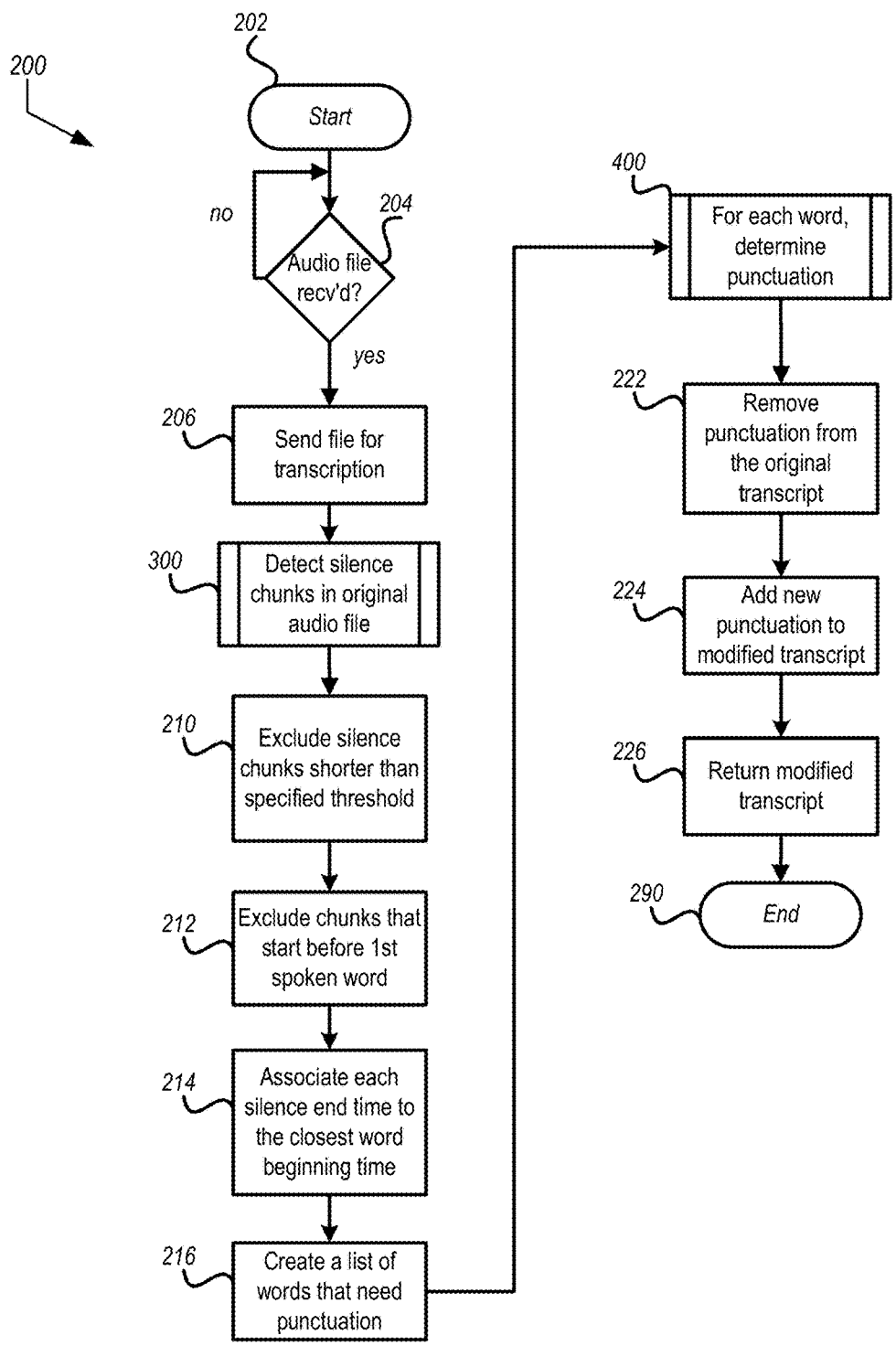
FIG. 2 is a process flow diagram for an example method of generating an improved punctuation transcript.

FIG. 2 is a process flow diagram for an example method of generating an improved punctuation transcript. The method 200 may be implemented in whole or in part by the devices shown in FIG. 1. In some implementations, the method 200 may be coordinated by a coordination device such as the transcription manager 102.

The method 200 begins at block 202. At block 204, the coordination device may determine whether audio file is received. The determination may include monitoring a memory location for the presence of one or more audio files. In some implementations, the determination may include receiving a request from a source device.

If the determination at block 204 is negative, the method 200 may continue waiting for an audio file by repeating the determination of block 204. The method 200 may include a delay between executions of block 204 to conserve processing resources that may be expended to make the determination. The delay may be milliseconds or seconds or minutes in length. The delay may be specified as a configuration value stored in a memory accessible by the coordination device. In some implementations, the delay may be dynamically identified based on, for example, historical rates of audio data received, time of day (e.g., during business hours the delay will be shorter than the delay during late night hours when fewer requests are anticipated), or the like.

If the determination at block 204 is affirmative, at block 206, the coordination device transmits the audio file to a transcription service to obtain transcription information. As discussed above, the coordination device may queue the audio file and dynamically assess which files to process and when to initiate the processing. Sending the audio file may include sending a message including the audio file. The audio file may be sent to a remote transcription service via a network connection. The audio file may be sent to a local transcription service executing as a process or element of the coordination device. In response, the coordination device receives transcription information from the transcription service. The transcription information may include a text file representing the spoken words represented by the audio data included in the audio file. The transcription information may include word timing data indicating temporally, where the words in the text file appear in the audio data.

At block 300, the coordination device may provide the transcription information and audio file to a punctuation improver to detect portions of the audio data representing silence in the original audio file. The detection of silence may be based on a silence threshold such that audio data with amplitude below the threshold will be coded as silence.

Figure 3:
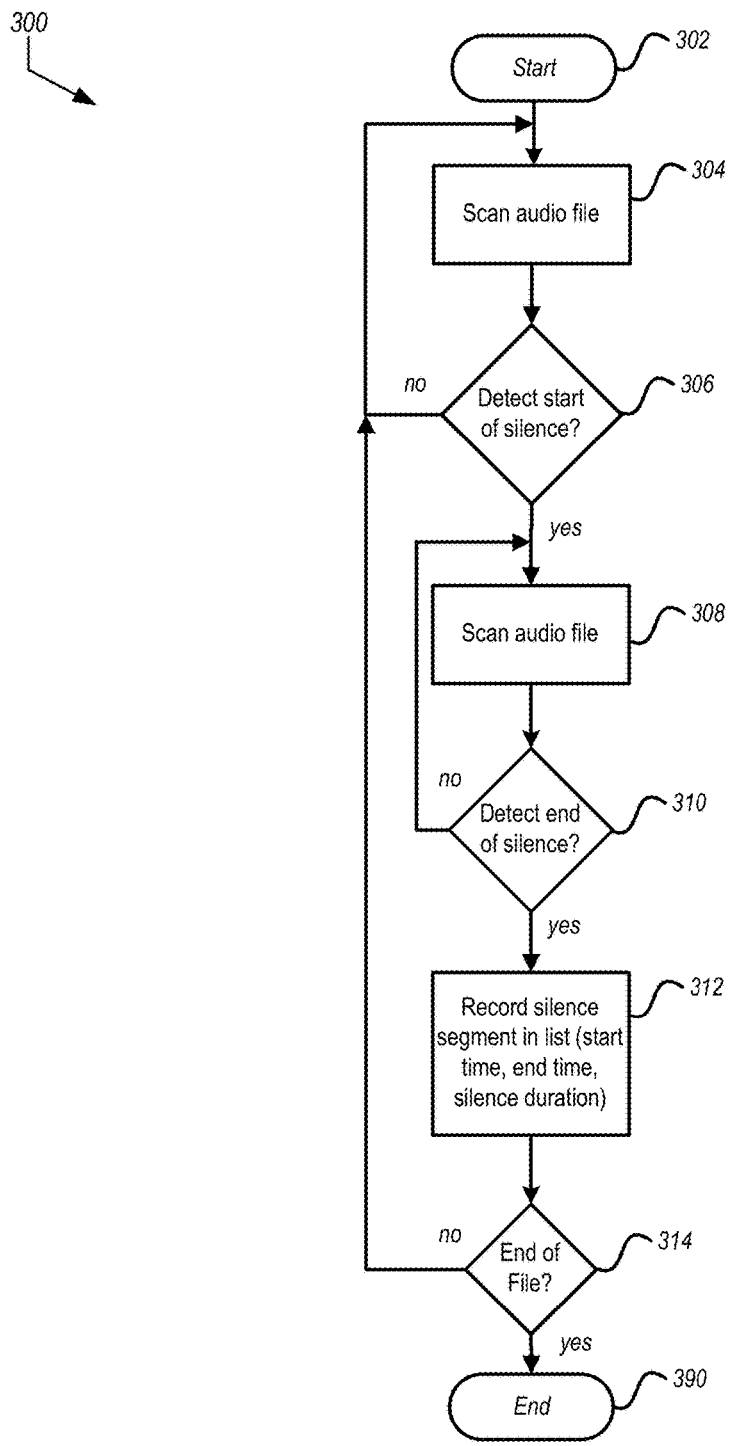
FIG. 3 is a process flow diagram for an example method of detecting silence in audio data.

FIG. 3 is a process flow diagram for an example method of detecting silence in audio data. The method 300 may be implemented in whole or in part by the devices shown in FIG. 1. In some implementations, the method 300 may be coordinated by a silence detection device such as the punctuation improver 104.

The method 300 begins at block 302. At block 304, the audio data included in the audio file is scanned from the start of the recording. The scanning process includes moving forward, chronologically, through the audio file to examine the audio data included in the audio file. At block 304, the punctuation improver 104 may assess a scanned portion of the audio data to determine whether start of silence is represented in the audio data. The start of silence may be determined based on amplitude of the audio data. Additional or alternative factors may be considered at block 306. For example, other audio characteristics for the audio data such as rate or tone may be assessed. If the rate, tone, amplitude, or other characteristics of the audio data do not correspond to a threshold, the determination at block 306 may be negative. In this case, silence has not yet been detected and the method 300 may return to block 304 as described to scan additional portions of the audio file.

If the determination at block 306 is affirmative, the method 300 may proceed to block 308 to continue scanning the audio data to identify the end point for the detected silence. Scanning at block 308 is similar to the scanning of block 304.

The scanning of block 308 may continue until the determination at block 310 affirmatively identifies the end of a silent period. The determination at block 310 may be similar to the determination at block 306. Once a scanned block is deemed to be a non-silent block, the end point for the silence will be recorded at block 312 as the portion scanned immediately prior to the current scanned block. Table 2 provides an example of recording silence start and stop times.

TABLE 2

| Scan point | Silence? | Recorded Event |
| --- | --- | --- |
| 1 | No | None |
| 2 | No | None |
| 3 | Yes | First Silence Start |
| 4 | Yes | None |
| 5 | Yes | First Silence End |
| 6 | No | None |

At block 314, a determination is made as to whether the scanning has reached the end of the audio file. The determination may be based on, for example, a duration for the audio file and a quantity of audio data scanned. If the determination at block 314 is affirmative, the method 300 may end at 390. If the determination at block 314 is negative, the method 300 may return to block 304 to continue scanning and detecting audio silences.

The detected portions of the audio file including silence, may be provided for further processing, such as discussed in FIG. 2.

Returning to FIG. 2, at block 210, the punctuation improver may exclude those portions of audio data identified in block 206 which do not correspond to a silence duration detection threshold. The length of a given silent period identified, such as through the method 300 in FIG. 3, may be too short to interpret as a punctuation silence. These silences may be excluded from further processing to allow the method 200 and associated hardware performing the transcription processing to dedicate resources to those portions of audio most likely to represent words needing punctuation.

At block 212, the punctuation improver may exclude those portions of audio data remaining after block 210 which appear before the first spoken word. For example, the word timings may identify the first word in the audio data. If a portion of audio data prior to the first word is identified as a silence, it may be excluded from further processing because it is unlikely that punctuation is needed for the leading silence detected.

At block 214, the punctuation improver may align the portions of audio data identified as silence remaining after block 212 with the word beginning timing for a word. This alignment creates an association between silences and words. A list of candidates for punctuation may be generated at block 214.

The associations for the candidates included in the list generated at block 214 are analyzed to determine whether punctuation is needed and if so, what form. At block 400, the punctuation improver may determine, for each candidate in the list, a type of punctuation.

Figure 4:
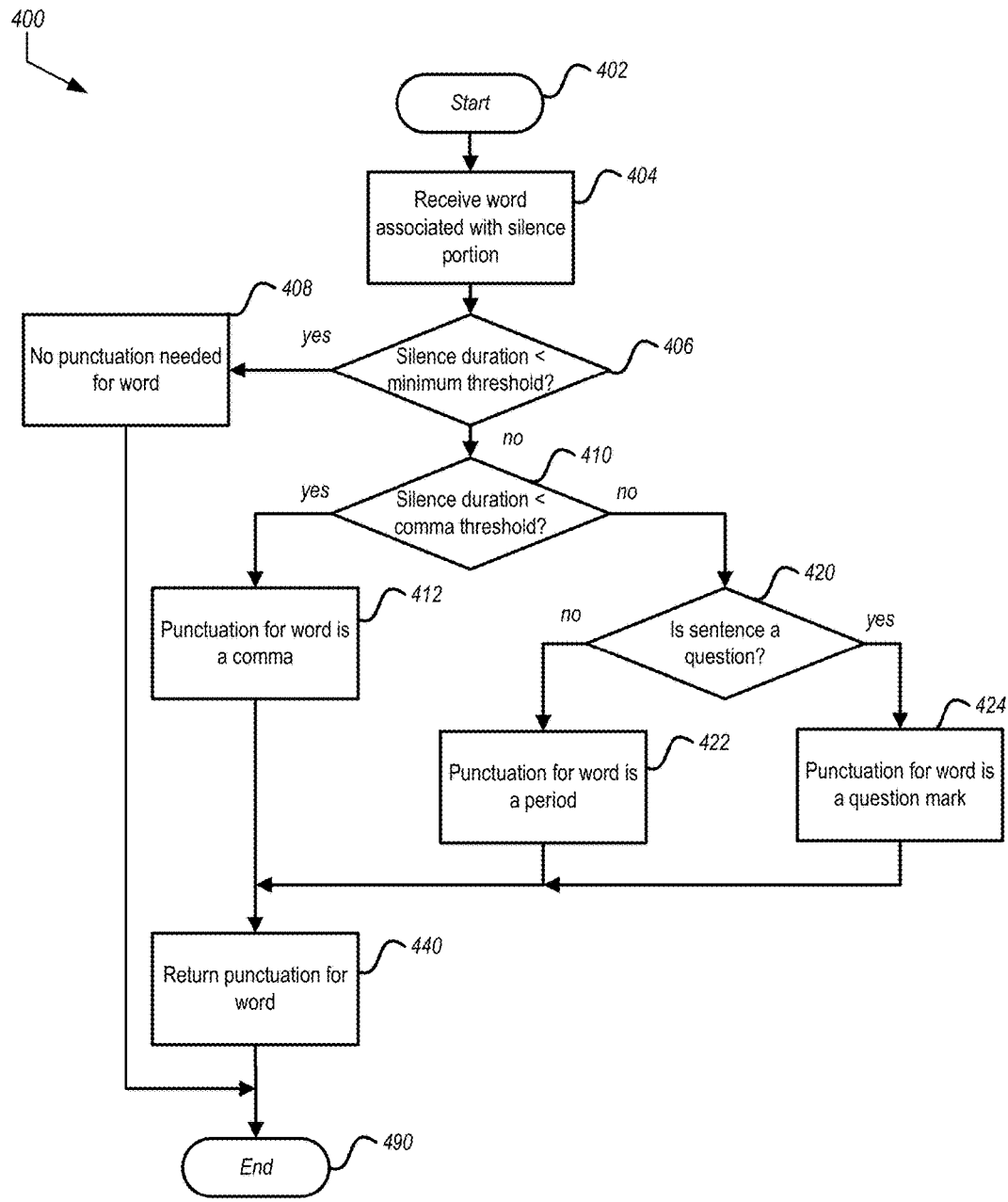
FIG. 4 is a process flow diagram illustrating an example method of identifying punctuation for a word associated with a silence.

FIG. 4 is a process flow diagram illustrating an example method of identifying punctuation for a word associated with a silence. The method 400 may be implemented in whole or in part by the devices shown in FIG. 1. In some implementations, the method 400 may be coordinated by a silence detection device such as the punctuation improver 104. The type of punctuation may be based on one or more timing thresholds. A timing threshold may be compared to the duration of the portion being assessed. If the duration exceeds the timing threshold, the punctuation type may be a period or question mark. If the duration is below the timing threshold, the punctuation type may be a comma or other non-terminal punctuation.

The method 400 begins at block 402. At block 404, punctuation coordination device may receive a word associated with a silence portion of an audio file. At block 406, a determination is made as to whether the duration of the silent portion corresponds to a threshold. As shown in FIG. 4, the correspondence may be based on a minimum threshold. It will be understood that alternate relationships may be implemented to achieve a similar assessment. For example, a range or maximum threshold may be implemented for the assessment at block 406.

If the determination at block 406 is affirmative, the length of the silence may be small enough to not warrant punctuation. For example, some silences between spoken words may not correspond to pauses typically associated with commas or periods. In such instances, the method 400 may continue to block 490 to end.

If the determination at block 406 is negative, the length of the silence may be associated with a deliberate pause in the speech which may be represented using a comma or other punctuation mark. At block 410, a determination is made as to whether the length of the silence corresponds to a comma duration threshold. The comma duration threshold indicates a length of time below which a pause will be deemed to be punctuated with a comma. If the determination at block 410 is affirmative, at block 412, the word received at block 404 is identified as needing a comma. This result may be returned at block 440 to the requesting device thereby ending the method 400 at block 490.

If the determination at block 410 is negative, the punctuation is something other than a comma. As shown in FIG. 4, the non-comma punctuations may include sentence terminating punctuations such as a period or a question mark. At block 420, the word or sentence in which the word is included is analyzed to determine whether the sentence is a question. The analysis may include keyword detection or natural language processing to determine a sentence type (e.g., interrogatory versus declarative). For example, natural language processing can be used to analyze the text itself from the transcript and further determine, from a language analysis, whether a punctuation mark is in the right location. Given that the word timings that return from the transcription service may not align exactly with the speech and silence sections of the audio file it is a best match from the audio silence detection to detect to where the punctuation belongs. With short words especially, placing a punctuation mark on either side of the word can be equally inaccurate. Natural language processing may be used to further analyze the meaning of the sentence with the punctuation mark in each position to determine the most logical place for the mark to belong. In some implementations, two versions of the punctuated text may be assessed with natural language processing to determining which version has a semantic intent that can be understood and, if both versions have understandable intents, which most closely aligns with a target intent. For example, the audio may be associated with a particular activity such as contacting customer service. In such instances, a version having an intent that is more closely aligned with customer service than another version may be selected.

If the determination at block 420 is affirmative, at block 424, a question mark is the identified punctuation for the word. This result may be returned at block 440 to the requesting device thereby ending the method 400 at block 490.

If the determination at block 420 is negative, at block 422, a period is identified as the punctuation for the word. This result may be returned at block 440 to the requesting device thereby ending the method 400 at block 490.

The method 400 may be adapted to dynamically punctuate words of different languages. A language detection process may be included to detect the language used in the audio file. For example, the text of the transcript may be reviewed to detect what language is being spoken. Additional or alternative detection methods include reviewing metadata included with the audio or known data about the audio (for example for a phone call, a country from which the call originated in may be detected and used to predict the language, or know what customer service call was made (e.g., to a Spanish speaking system)).

Once the language is detected, the method 200 may include choosing a transcription service to use for that specific language to get the best transcription result. Different transcription solutions will have a different success rate/quality/performance for different languages and likely no single engine will be best for all languages. The parameters for rating and selecting a service may be included in a transcription configuration.

In the case of Spanish compared to English, when punctuating an interrogative or exclamatory sentence, for example, a second punctuation mark (the inverted question mark or exclamation point, respectively) may be needed at the beginning of the affected sentence. In such instances, the method 400 may include language specific punctuations. A punctuation rule may be implemented to identify additional or alternative punctuations for words in the identified language.

Returning to FIG. 2, the method 400 may be repeated for additional words that may need punctuation. Once the words have been processed, at block 222, any punctuation included in the text file transcription received from the transcription service is removed. Removing may include copying the text to a new file or performing search and replace function on the text file.

At block 224, the punctuation associated with the items in the candidate list are added into the stripped text from block 220. For example, words may be stored in a list in conjunction with their respective start and end times. Specific words may be modified through string manipulation based on their timings. Repeated words may not matter because the system can identify an instance of the word to modify based on the timing. The final transcript may be a concatenation of the word list. In some implementations, the addition of punctuation may also include adjusting capitalization of words. For example, upon adding a period, it may be desirable to capitalize the word appearing in the transcript after the period.

At block 226, the punctuation improver may notify the coordination device that the improved transcript is available. The notification may include transmitting a message or control signal indicating the availability of the improved transcription file. The notification may include adding a message to a message queue including an identifier for the improved transcription file. The identifier may be a filename, file location, or other unique identifier associated with the improved transcription file. In some implementations, the notification may include an identifier for the underlying audio data used to generate the improved transcription file (e.g., session identifier, user identifier, request identifier, etc.).

At block 290, the method 200 ends for the received audio file. However, the method 200 may be repeated to continue processing a subsequently received audio file.

The thresholds used in method 200, 300, and 400 such as the comma threshold, silence duration threshold, and silence amplitude threshold, may be defined in a transcription configuration accessible to the coordinating device. In some implementations, a threshold may be dynamically generated to account for differences between users and patterns of speech. For example, for a person who speaks quickly, the length of time for this person's silences may be shorter than someone who speaks more slowly. Similarly, a person who speaks softly may have a lower amplitude threshold for what constitutes "silence" than a person who speaks more loudly. The methods 200, 300, of 400 may include storing profiles of speakers which can be refined overtime as more audio data is processed for the speaker.

Figure 5:
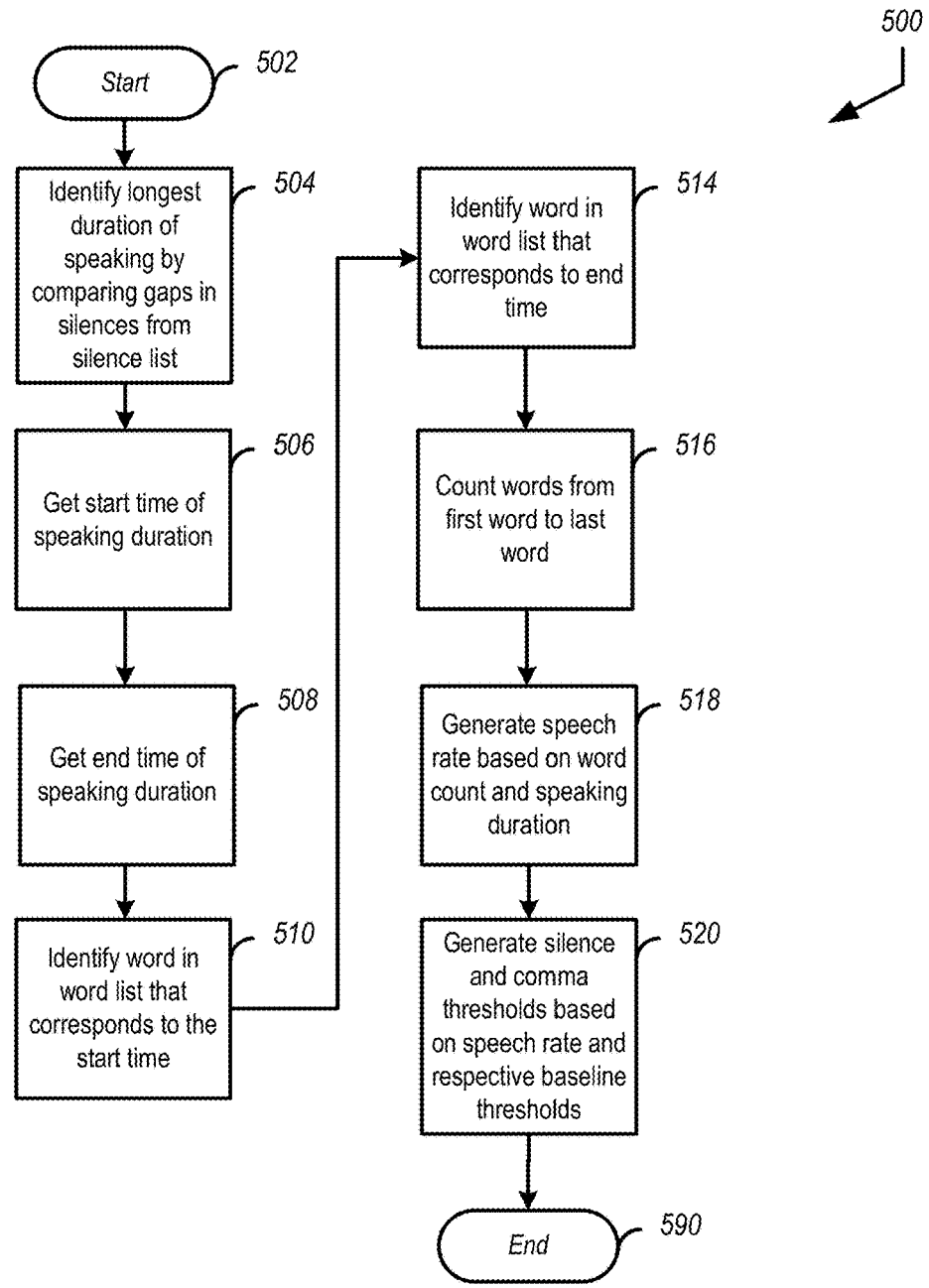
FIG. 5 is a process flow diagram illustrating an example method of dynamic threshold generation.

FIG. 5 is a process flow diagram illustrating an example method of dynamic threshold generation. The method 500 may be implemented in whole or in part by the devices shown in FIG. 1. In some implementations, the method 500 may be coordinated by a threshold generating device such as the transcription manager 102 or the punctuation improver 104.

The method 500 begins at block 502. The method 500 assumes that audio data is available to generate a threshold for the speaker of utterances represented in the audio data. At block 504, the threshold generating device identifies the longest duration of speaking. The longest duration may be identified by comparing the gaps in silences from a list of identifier portions of the audio data including silence. The portions may be identified using, for example, the method 300 in FIG. 3.

At block 506, the start time of the portion of the audio data identified at block 504 is obtained. At block 506, the end time of the portion of the audio data identified at block 504 is obtained.

At block 510, the word in the word list included in the transcription information that corresponds to the start time for the portion of the audio data identified at block 504 is identified. The correspondence may be assessed using a matching algorithm or a fuzzy match such as within a tolerance (e.g., 0.5 milliseconds).

At block 514, the word in the word list included in the transcription information that corresponds to the end time for the portion of the audio data identified at block 504 is identified. As with block 510, the correspondence at block 514 may be assessed using an absolute matching algorithm or a fuzzy match such as within a tolerance (e.g., 0.5 milliseconds).

The identification at block 510 and 514 detect the first word in the word list. This provides a starting point (e.g., block 510) and an ending point (e.g., block 514) to count a total number of words represented in the audio data.

At block 516, a number of words from the starting point to the ending point are generated. At block 518, a speech rate is generated based at least in part on the number of words and the speaking duration (e.g., start time to end time). The speech rate may be specified as a number of words per unit time.

At block 520, based at least in part on the speech rate, thresholds may be generated. For example, a comma duration threshold or silence duration threshold may be generated by comparing the speech rate from block 518 with a baseline threshold. The baseline threshold may be adjusted as a percent of the speech rate or other expression of the relationship between the speech rate and the baseline threshold.

As discussed, a threshold generated at block 520 may be stored in association with an identifier for the audio source (e.g., an automated call center system), user, or other audio source of the utterance. The threshold may be stored in a data store such as the data store 160 shown in FIG. 1.

Figure 6:
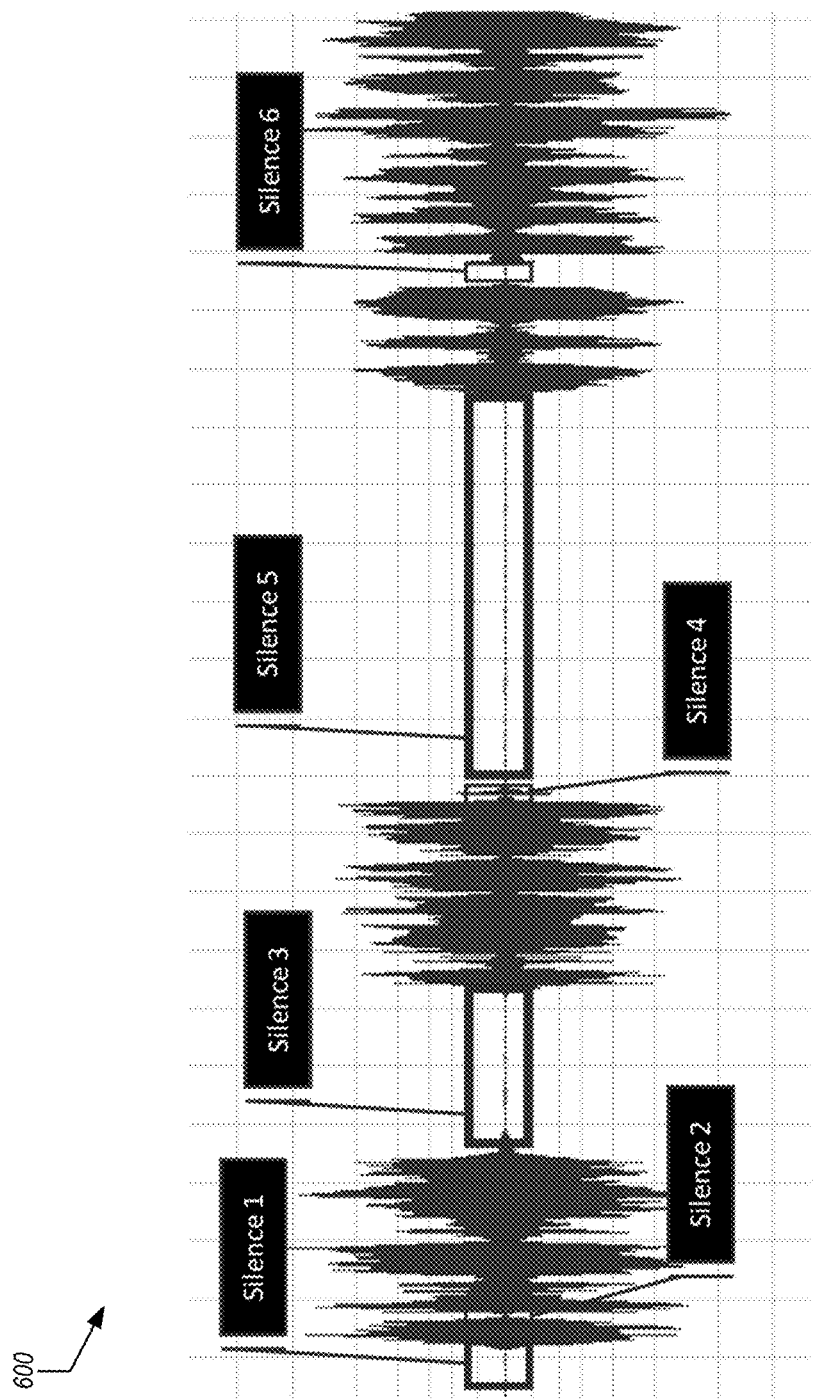
FIG. 6 is a pictorial diagram illustrating an audio waveform diagram annotated with detected silences.

FIG. 6 is a pictorial diagram illustrating an audio waveform diagram annotated with detected silences. The waveform diagram 600 is annotated with detected silences. The annotation graphically illustrates how the audio data may be processed to identify silent portions. As shown in FIG. 6, there are six silences identified in the audio data.

Figure 7:
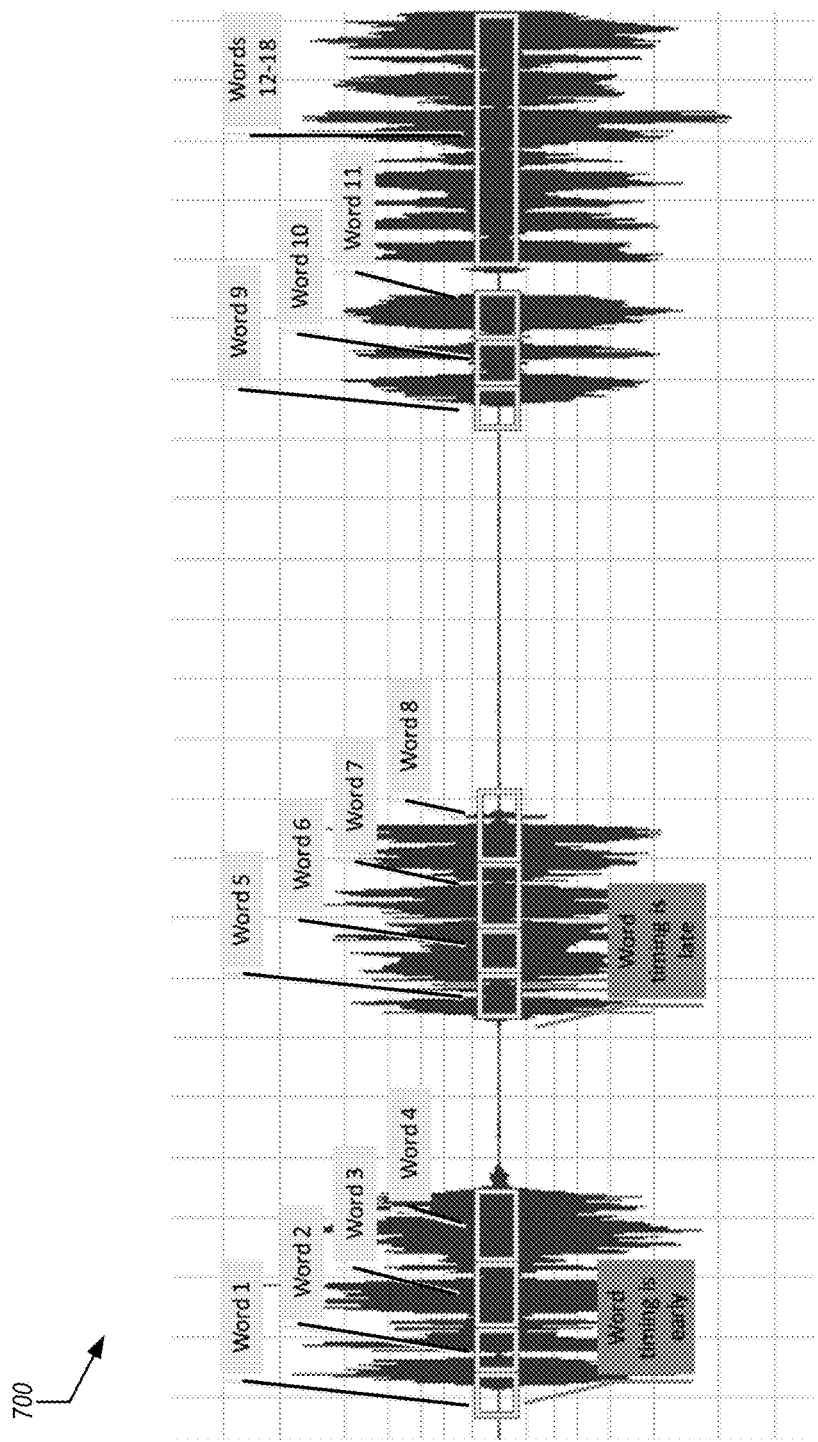
FIG. 7 is a pictorial diagram illustrating the audio waveform diagram of FIG. 6 annotated with word timings for words identified in the transcription information.

FIG. 7 is a pictorial diagram illustrating the audio waveform diagram of FIG. 6 annotated with word timings for words identified in the transcription information. The waveform diagram 700 is annotated with words and word timings detected which may be included in the transcription information. The diagram 700 shows eighteen words detected and each word is associated with a bounding box representing the start and end time for respective words. As shown in FIG. 7, the timing for word 1 does not fully capture the word represented in the audio data. The timing box includes the wave pattern for word 1 but does not accurately bound the wave pattern. In this instance, the timing information is early. Note the effect this has on subsequent words (e.g., word 2 through word 4). Attempting to properly analyze and punctuate words 1 through 4 may be negatively impacted by the early timing error.

Timing may also be late. The timing for word 5 begins partially through the wave patterns representing word 5. Like the timing for word 1, this inaccuracy can impact the timing information for subsequent words (e.g., words 6 through 8). Experiments have shown that within an audio file, the timing may be inconsistently early or late. That is, some portions may be tagged early while other portions tagged late. Furthermore, the magnitude of the timing error may change from word to word. This makes predicting timing error, such as based on the source of the transcription information, unreliable.

Figure 8:
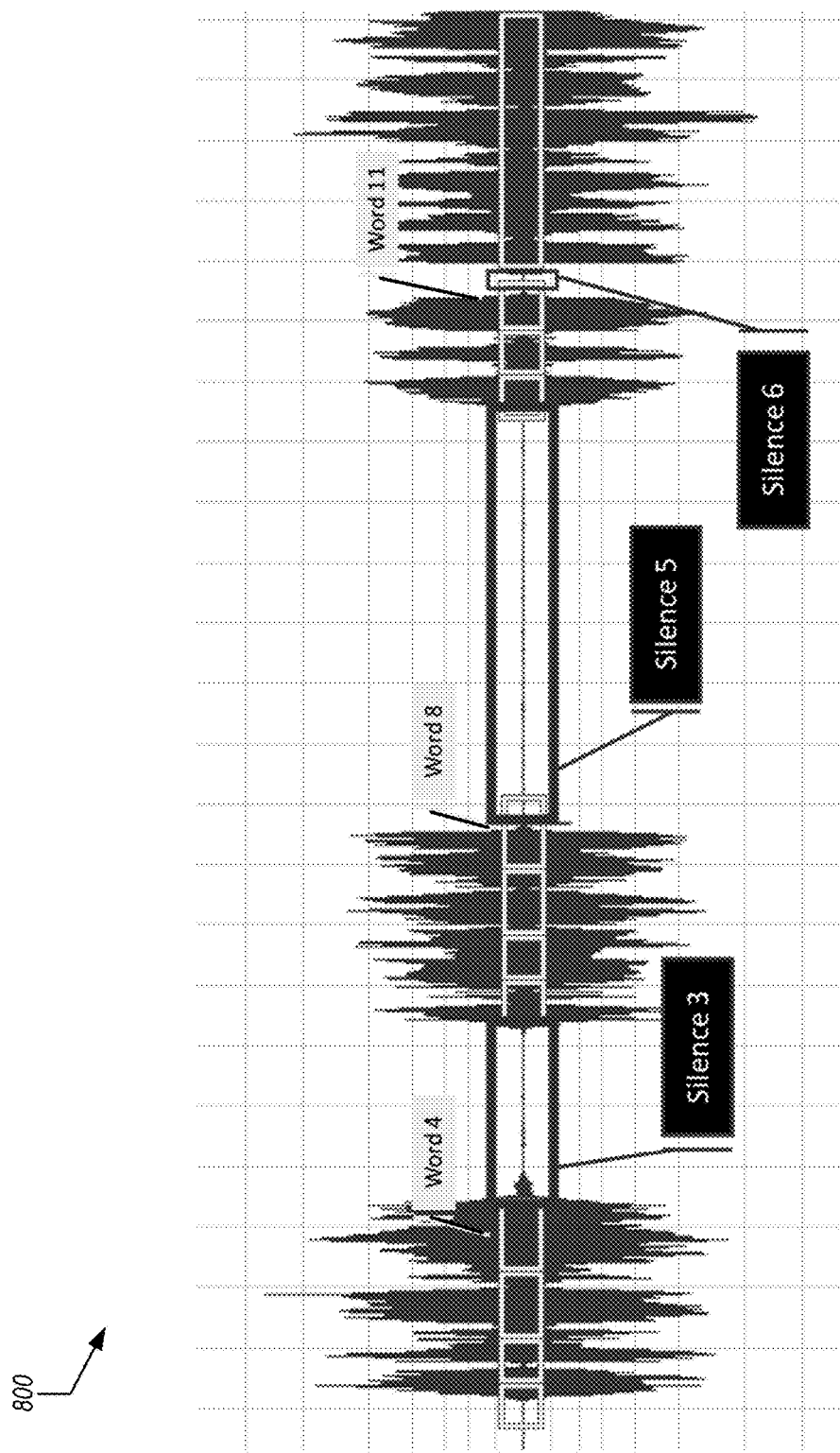
FIG. 8 is a pictorial diagram illustrating the audio waveform diagram of FIGS. 6 and 7 with silences relevant to punctuation shown in association with the words to be punctuated.

FIG. 8 is a pictorial diagram illustrating the audio waveform diagram of FIGS. 6 and 7 with silences relevant to punctuation shown in association with the words to be punctuated. The waveform diagram 800 includes the significant silences aligned with the words which may be punctuated. Silence 1 is excluded because it precedes any words. Silences 2, 4, and 6 are excluded because the lengths of these silences do not correspond to a silence duration threshold (e.g., the silences are shorter than the silence duration threshold). Silence 3 did meet the silence duration threshold and is a candidate for punctuation. The start time of silence 3 most closely corresponds to the end of word 4. This allows the punctuation improver to associate silence 3 with word 4. Similarly, the start time for silence 5 is most closely aligned with the end timing for word 8 and the start time for silence 6 is most closely aligned with the end timing of word 11.

As discussed above, the silences shown in FIG. 8 may be assessed for punctuation. The punctuation may depend on the silence length or analysis of the word associated with the silence, or speech analysis of the entire utterance (e.g., full sentence or conversation analysis).

Figure 9:
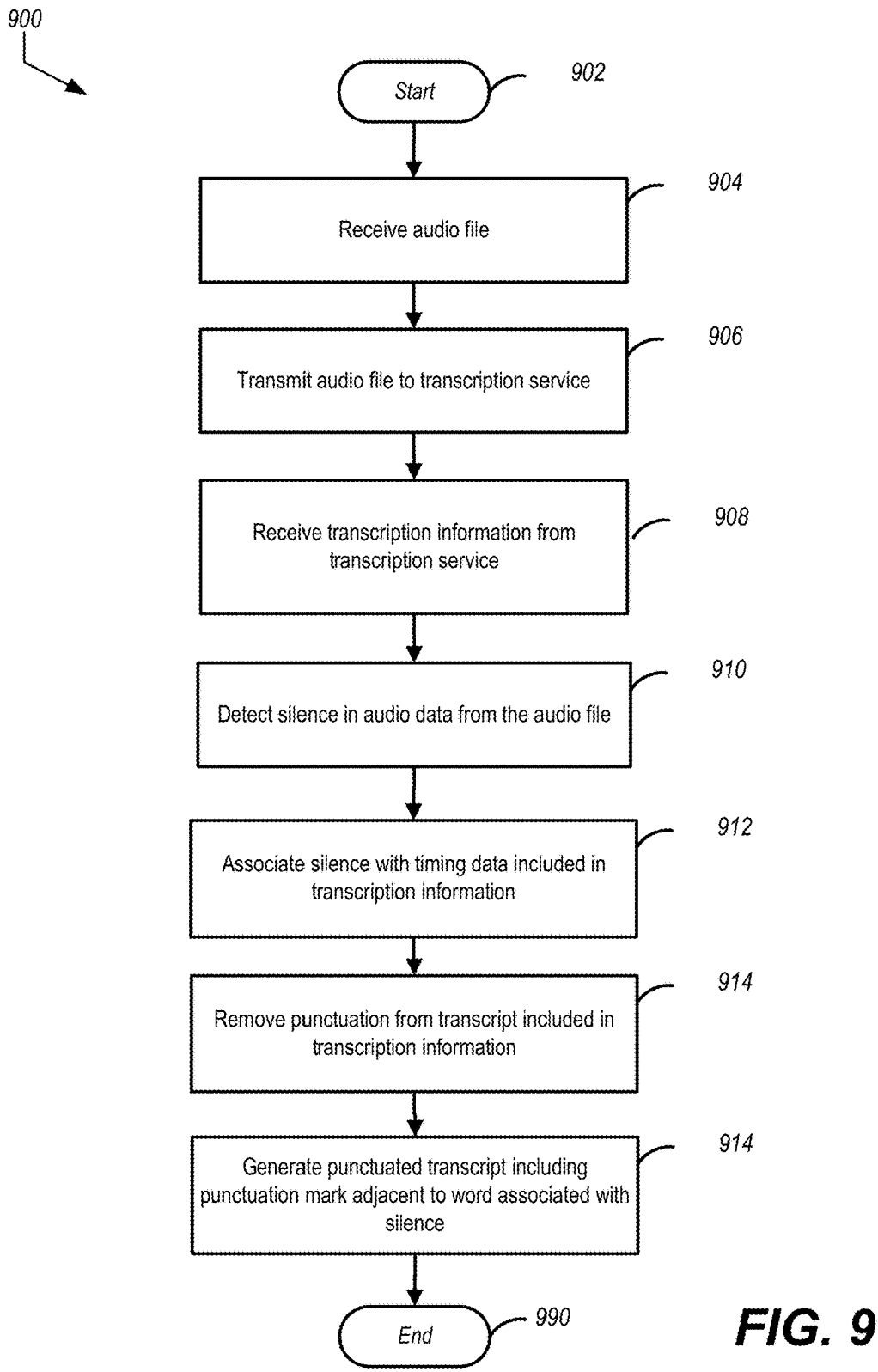
FIG. 9 is a process diagram illustrating another example method of processing an audio file to generate a transcript with enhanced punctuations.

FIG. 9 is a flow diagram depicting an illustrative routine executed by one or more devices to generate an enhanced transcription of audio data. The method 900 may be implemented in whole or in part by the devices shown in FIG. 1. In some implementations, the method 900 may be coordinated by a transcription device such as the transcription manager 102.

The method 900 begins at block 902. At block 904, an audio file including audio data for spoken words is received. At block 906, the audio file may be transmitted to a transcription device. The transmission may be to a process executing locally with the transcription device or to a remote, networked based service. At block 908, transcription information is received from the transcription device. The transcription information may include a transcript of the spoken words represented by the audio data. The transcription information may include word timing information identifying a position where the transcription device identified each of the spoken words in the audio data. At block 910, an audio silence may be detected in the audio data. The detection may include analyzing a characteristic of the audio data such as amplitude, tone, or rate. The detection may include analyzing the semantics of one or more spoken words. In some implementations, detecting silence may include detecting a non-speech portion of the audio data (e.g., no utterances detected within the portion) based at least in part on at least one of: amplitude, frequency, pitch, speed, or tone of the non-speech portion of audio data in relation to a non-speech detection threshold. At block 912, a detected audio silence is associated with a word timing for a spoken word included in the spoken words. The word timing may be timing information included in the transcription information. At block 914, punctuation characters are removed from the transcript received from the transcription service. At block 916, a punctuated transcript may be generated by including a punctuation mark adjacent to the spoken word associated with the audio silence. The method 900 ends at block 990 but may be repeated to process additional audio files.

In some implementations of the method 900, detecting the audio silence may include identifying portions of the audio data having an amplitude below a threshold and determining that a length of a portion of the audio data corresponds to a silence duration threshold. A look up table may be stored in a data store. The look up table may be associated with punctuation marks with silence durations. The method 900 may include identifying the punctuation mark from the look up table based at least in part on the length of the one of the portions corresponding to the silence duration threshold. The method 900 may include generating a speech rate for the audio data for the spoken words. The speech rate may identify a quantity of words spoken over a period of time. The speech rate may be used to generate the silence duration threshold based at least upon a baseline speech rate and/or a baseline silence length.

The method 900 may include storing a set of unpunctuated words which are not associated with punctuation. The method 900 may consult the set of unpunctuated words before generating the punctuated transcript to ensure the word is not included in the unpunctuated set of words.

The method 900 may include associating the audio silence with a second word timing for a second spoken word included in the spoken words, generating a second punctuated transcript by including the punctuation mark prior to the second spoken word associated with the audio silence, receiving, from a natural language processing system, first intent data identifying a first semantic intent for the punctuated transcript, receiving, from the natural language processing system, second intent data identifying a second semantic intent for the second punctuated transcript; and determining that the first intent data more closely reflects a target semantic intent than the second intent data.

Some instances of the method 900 may include detecting an audio characteristic for a portion of the audio data associated with the spoken word and determining a start time or an end time for the spoken word based at least in part on a comparison of the audio characteristic with the audio characteristic for at least one other portion of the audio data. The audio characteristic may include one or more of pitch, speed, or tone of the audio data. The word timing for the spoken word may be updated based at least in part on a determined start time or end time. In some implementations, the comparison may be used to identify the punctuation mark used for the spoken word or utterance related thereto.

The thresholds in method 900 may be dynamically generated such as using the method 500 shown in FIG. 5.

The method 900 may be stored as specific computer-executable instructions in a data store. A system including a computing device in communication with the data store may be provided. The computing device may include a processor that executes the specific computer-executable instructions to cause the system to perform at least a portion of the method 900.

Figure 10:
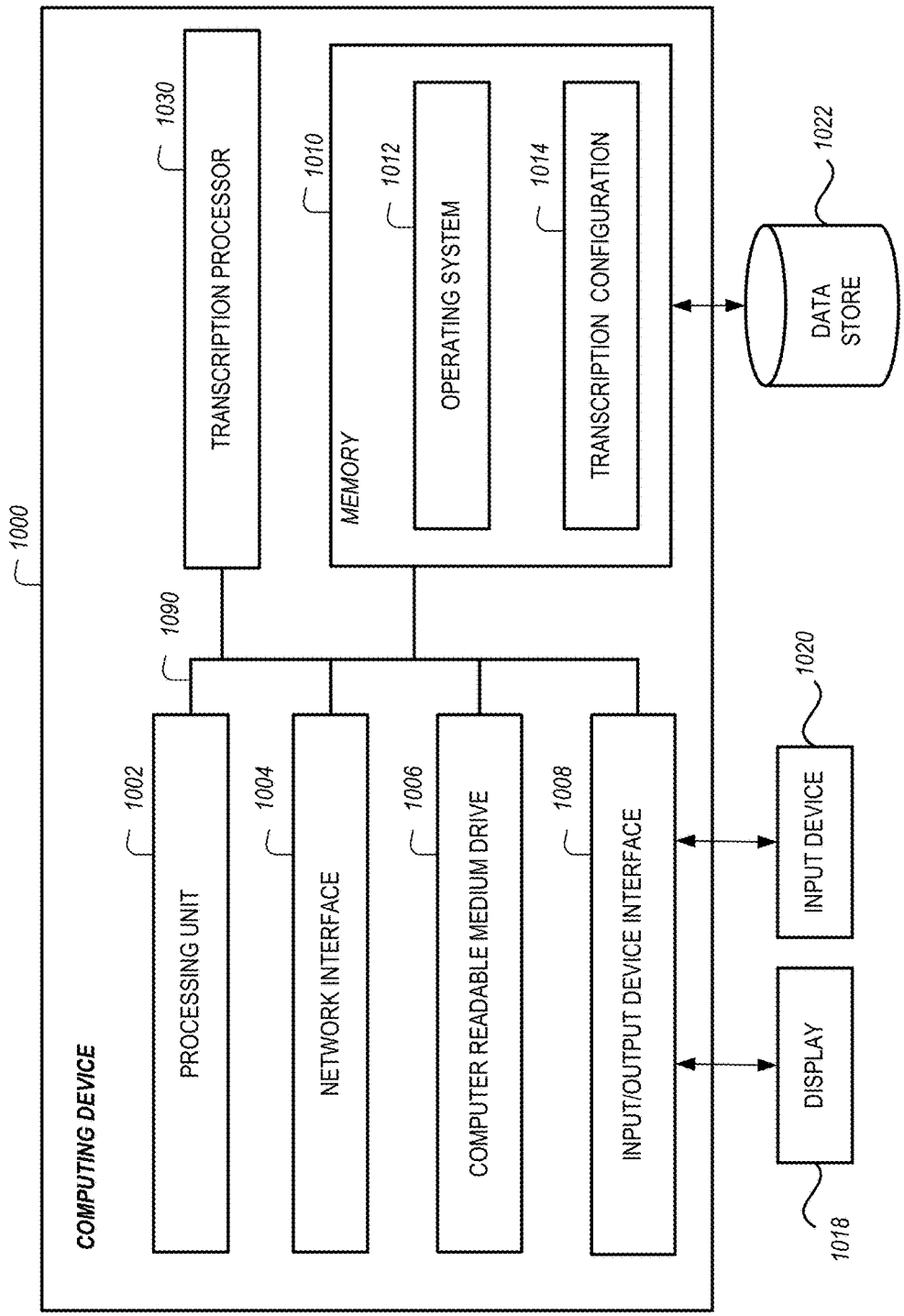
FIG. 10 is a block diagram depicting an illustrative computing device that can implement the content enhancement engine shown in FIG. 1.

FIG. 10 is a block diagram depicting an illustrative computing device that can implement the transcription features described. The computing device 1000 can be a server or other computing device, and can comprise a processing unit 1002, a transcription processor 1030, a network interface 1004, a computer readable medium drive 1006, an input/output device interface 1008, and a memory 1010. The network interface 1004 can provide connectivity to one or more networks or computing systems. The processing unit 1002 can receive information and instructions from other computing systems or services via the network interface 1004. The network interface 1004 can also store data directly to memory 1010 or other data store. The processing unit 1002 can communicate to and from memory 1010 and output information to an optional display 1018 via the input/output device interface 1008. The input/output device interface 1008 can also accept input from the optional input device 1020, such as a keyboard, mouse, digital pen, microphone, mass storage device, etc.

The memory 1010 contains specific computer program instructions that the processing unit 1002 may execute to implement one or more embodiments. The memory 1010 may include RAM, ROM, and/or other persistent, non-transitory computer readable media. The memory 1010 can store an operating system 1012 that provides computer program instructions for use by the processing unit 1002 or other elements included in the computing device in the general administration and operation of the computing device 1000. The memory 1010 can further include computer program instructions and other information for implementing aspects of the present disclosure.

For example, in one embodiment, the memory 1010 includes a transcription configuration 1014. The transcription configuration 1014 may include the thresholds (e.g., non-speech detection threshold, silence detection threshold, silence duration threshold, etc.), transcription service(s) or information to access a transcription service, punctuation types, and other configurable parameters to dynamically adjust the transcription processor 1030 and/or the computing device 1000 to process transcription requests and generate enhanced transcripts as described above. The transcription configuration 1014 may store specific values for a given configuration element. For example, the specific threshold value may be included in the transcription configuration 1014. The transcription configuration 1014 may, in some implementations, store information for obtaining specific values for a given configuration element such as from a network location (e.g., URL).

The memory 1010 may also include or communicate with one or more auxiliary data stores, such as data store 1022. The data store 1022 may electronically store data regarding the audio being transcribed, characteristics of the audio source, generated thresholds, transcripts, transcription information, and the like.

The elements included in the computing device 1000 may be coupled by a bus 1090. The bus 1090 may be a data bus, communication bus, or other bus mechanism to enable the various components of the computing device 1000 to exchange information.

In some embodiments, the computing device 1000 may include additional or fewer components than are shown in FIG. 10. For example, a computing device 1000 may include more than one processing unit 1002 and computer readable medium drive 1006. In another example, the computing device 1000 may not be coupled to a display 1018 or an input device 1020. In some embodiments, two or more computing devices 1000 may together form a computer system for executing features of the present disclosure.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations, or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A coordination device can be or include a microprocessor, but in the alternative, the coordination device can be or include a controller, microcontroller, or state machine, combinations of the same, or the like configured to coordinate the processing of audio data to generate an accurate transcript of an utterance represented by the audio data. A coordination device can include electrical circuitry configured to process computer-executable instructions. Although described herein primarily with respect to digital technology, a coordination device may also include primarily analog components. For example, some or all of the transcription algorithms or interfaces described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, interface, or algorithm described in connection with the embodiments disclosed herein can be embodied directly in specifically tailored hardware, in a specialized software module executed by a coordination device, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. An illustrative storage medium can be coupled to the coordination device such that the coordination device can read information from, and write information to, the storage medium. In the alternative, the storage medium can be integral to the coordination device. The coordination device and the storage medium can reside in an application specific integrated circuit (ASIC). The ASIC can reside in an access device or other coordination device. In the alternative, the coordination device and the storage medium can reside as discrete components in an access device or electronic communication device. In some implementations, the method may be a computer-implemented method performed under the control of a computing device, such as an access device or electronic communication device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "a" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein, a "user interface" (also referred to as an interactive user interface, a graphical user interface, an interface, or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), ADOBE® FLASH®, JAVA®, MICROSOFT® .NET®, web services, and rich site summary (RSS). In some implementations, a UI may be included in a stand-alone client (for example, thick client, fat client) configured to communicate (e.g., send or receive data) in accordance with one or more of the aspects described.

As used herein, a "call" may encompass a wide variety of telecommunication connections between at least a first party and a second party. A call may additionally encompass a communication link created by a first party that has not yet been connected to any second party. A call may be a communication link between any combination of a communication device (e.g., a telephone, smartphone, hand held computer, etc.), a VoIP provider, other data server, a call center including any automated call handling components thereof, or the like. A call may include connections via one or more of a public switched telephone network (PSTN), wired data connection, wireless internet connection (e.g., LTE, Wi-Fi, etc.), local area network (LAN), plain old telephone service (POTS), telephone exchanges, or the like. A call may include transmission of audio data and/or non-audio data, such as a text or other data representation of an audio input (e.g., a transcript of received audio). Accordingly, a connection type for a call may be selected according to the type of data to be transmitted in the call. For example, a PSTN or VoIP connection may be used for a call in which audio data is to be transmitted, while a data connection may be used for a call in which a transcript or other non-audio data will be transmitted.

As used herein, a "hold" or a "held call" can encompass a wide variety of pauses or suspensions in a call. A held call may be in a configuration in which a connection is maintained between two parties to a call. While a call is held, audio such as music, on hold messaging or other recorded audio may be transmitted to at least one party to the call. The party to which the audio is transmitted may be referred to as being "on hold."

As used herein, an "open call" refers to a call available to be transferred to a user. For example, an open call may be a call between a VoIP provider and a call center ready to be bridged with a user call.

As used herein, "bridging" or "merging" refer to a variety of processes of combining two or more calls into a single call. For example, a call between a VoIP provider and a communication device may be bridged with a call between the VoIP provider and a call center such that the user and an agent at the call center can exchange voice transmissions. In another example, a communication device connected to two or more calls (e.g., cellular, VoIP, or PSTN calls) may bridge or merge the calls together such that the three or more parties to the original two or more calls can exchange audio transmissions.

As used herein, "making," "placing," or "initiating" a call refers to a process of creating a call by one party to the call.

As used herein, "accepting" a call refers to a process that a user or the user's device can perform to allow voice transmission on both sides of the call.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes that come within the meaning and range of equivalency of the claims are to be embraced within their scope.

What is claimed is:

1. A computer-implemented method comprising:
under control of one or more processing devices,
receiving an audio file including audio data for spoken words;
transmitting, to a transcription device, the audio file;
receiving, from the transcription device, transcription information, wherein the transcription information includes:
(i) a transcript of the spoken words, and
(ii) word timings identifying a position where the transcription device identified each of the spoken words in the audio data;
detecting an audio silence in the audio data;
associating the audio silence with a word timing for a spoken word included in the spoken words based on a matching of a start time of the audio silence with an end time of the spoken word, wherein the start time of the audio silence is determined from the audio data, and wherein the end time of the spoken word is included in the word timings received from the transcription device;
removing punctuation characters from the transcript of the spoken words; and
generating a punctuated transcript by including a punctuation mark adjacent to the spoken word associated with the audio silence.

2. The computer-implemented method of claim 1, wherein detecting the audio silence comprises:
identifying portions of the audio data having an amplitude below a threshold, wherein one of the portions includes the audio silence; and
determining that a length of the one of the portions is greater than or equal to a silence duration threshold.

3. The computer-implemented method of claim 2, further comprising:
storing, in a data store, a look up table associating punctuation marks with silence durations; and
identifying the punctuation mark from the look up table based at least in part on the length of the one of the portions being greater than or equal to the silence duration threshold.

4. The computer-implemented method of claim 2, further comprising:
generating a speech rate for the audio data for the spoken words, wherein the speech rate identifies a quantity of words spoken over a period of time; and
generating the silence duration threshold based at least on the speech rate in relation to at least one of: (i) a baseline speech rate, and (ii) a baseline silence length.

5. The computer-implemented method of claim 1, wherein the punctuation mark is included in a set of punctuation marks, and wherein the computer-implemented method further comprises:
detecting a keyword in the transcript; and
identifying the punctuation mark from the set of punctuation marks based at least in part on the keyword.

6. The computer-implemented method of claim 1, wherein the punctuation mark is included in a set of punctuation marks, and wherein the computer-implemented method further comprises:
storing, in a data store, a set of unpunctuated words; and
prior to generating the punctuated transcript, determining that the spoken word is not included in the set of unpunctuated words.

7. The computer-implemented method of claim 1, further comprising:
associating the audio silence with a second word timing for a second spoken word included in the spoken words;
generating a second punctuated transcript by including the punctuation mark with the second spoken word associated with the audio silence;
receiving, from a natural language processing system, first intent data identifying a first semantic intent for the punctuated transcript;
receiving, from the natural language processing system, second intent data identifying a second semantic intent for the second punctuated transcript; and
determining that the first intent data more closely reflects a target semantic intent than the second intent data.

8. The computer-implemented method of claim 1, comprising:
detecting an audio characteristic for a portion of the audio data associated with the spoken word; and
identifying the punctuation mark for the spoken word based at least in part on a comparison of the audio characteristic with the audio characteristic for at least one other portion of the audio data.

9. The computer-implemented method of claim 8, wherein the audio characteristic comprises at least one of: pitch, speed, or tone of the audio data.

10. The computer-implemented method of claim 1, further comprising adjusting capitalization of a word adjacent to the punctuation mark in the punctuated transcript, wherein the punctuation mark comprises at least one of a period or a question mark.

11. A system comprising:
a data store storing specific computer-executable instructions; and
a computing device in communication with the data store, the computing device including a processor that executes the specific computer-executable instructions to cause the system to at least:
receive an audio file including audio data for spoken words;
transmit, to a transcription device, the audio file;
receive, from the transcription device, transcription information, wherein the transcription information includes:
(i) a transcript of the spoken words, and
(ii) word timings identifying a position where the transcription device identified each of the spoken words in the audio data;
detect an audio silence in the audio data;
associate the audio silence with a word timing for a spoken word included in the spoken words based on a matching of a start time of the audio silence with an end time of the spoken word, wherein the start time of the audio silence is determined from the audio data, and wherein the end time of the spoken word is included in the word timings received from the transcription device;

remove punctuation characters from the transcript of the spoken words; and generate a punctuated transcript by including a punctuation mark adjacent to the spoken word associated with the audio silence.

12. The system of claim 11, wherein the processor executes the specific computer-executable instructions to cause the system to detect the audio silence by at least:

identifying portions of the audio data having an amplitude below a threshold, wherein one of the portions includes the audio silence; and determining that a length of the one of the portions is greater than or equal to a silence duration threshold.

13. The system of claim 12, wherein the processor executes the specific computer-executable instructions to further cause the system to:

store, in a data store, a look up table associating punctuation marks with silence durations;

identify the punctuation mark from the look up table based at least in part on the length of the one of the portions being greater than or equal to the silence duration threshold.

14. The system of claim 12, wherein the processor executes the specific computer-executable instructions to further cause the system to:

generate a speech rate for the audio data for the spoken words, wherein the speech rate identifies a quantity of words spoken over a period of time; and generate the silence duration threshold based at least on the speech rate in relation to at least one of: (i) a baseline speech rate, and (ii) a baseline silence detection threshold length.

15. The system of claim 11, wherein the punctuation mark is included in a set of punctuation marks, and wherein the processor executes the specific computer-executable instructions to further cause the system to:

detect a keyword in the transcript; and identify the punctuation mark from the set of punctuation marks based at least in part on the keyword.

16. The system of claim 11, wherein the punctuation mark is included in a set of punctuation marks, and wherein the processor executes the specific computer-executable instructions to further cause the system to:

store, in a data store, a set of unpunctuated words; and prior to generating the punctuated transcript, determine that the spoken word is not included in the set of unpunctuated words.

17. The system of claim 11, wherein the processor executes the specific computer-executable instructions to further cause the system to:

associate the audio silence with a second word timing for a second spoken word included in the spoken words;

generate a second punctuated transcript by including the punctuation mark prior to the second spoken word associated with the audio silence;

receive, from a natural language processing system, first intent data identifying a first semantic intent for the punctuated transcript;

receive, from the natural language processing system, second intent data identifying a second semantic intent for the second punctuated transcript; and determine that the first intent data more closely reflects a target semantic intent than the second intent data.

18. The system of claim 11, wherein the processor executes the specific computer-executable instructions to further cause the system to:

detect an audio characteristic for a portion of the audio data associated with the spoken word; and identify the punctuation mark for the spoken word based at least in part on a comparison of the audio characteristic with the audio characteristic for at least one other portion of the audio data.

19. The system of claim 18, wherein the audio characteristic comprises at least one of: pitch, speed, or tone of the audio data.

20. The system of claim 11 wherein the processor executes the specific computer-executable instructions to further cause the system to detect language of the spoken words based at least in part on a source of the audio file, and wherein generating the punctuated transcript comprises:

identifying a punctuation rule for the language of the spoken words;

including the punctuation mark in the punctuated transcript according to the punctuation rule for the language.

21. A computer-implemented method comprising:

under control of one or more processing devices, receiving an audio file including audio data for spoken words;

transmitting, to a transcription device, the audio file;

receiving, from the transcription device, transcription information, wherein the transcription information includes:

(i) a transcript of the spoken words, and (ii) word timings identifying a position where the transcription device identified each of the spoken words in the audio data;

detecting a non-speech portion of the audio data based at least in part on at least one of: amplitude, frequency, pitch, speed, or tone of the non-speech portion of audio data in relation to a non-speech detection threshold;

associating the non-speech portion with a word timing for a spoken word included in the spoken words based on a matching of a start time of the non-speech portion with an end time of the spoken word, wherein the start time of the non-speech portion is determined from the audio data, and wherein the end time of the spoken word is included in the word timings received from the transcription device;

removing punctuation characters from the transcript of the spoken words; and generating a punctuated transcript by including a punctuation mark adjacent to the spoken word associated with the non-speech portion.

22. The computer-implemented method of claim 21, wherein the punctuation mark is included in a set of punctuation marks, and wherein the computer-implemented method further comprises:

detecting a keyword in the transcript; and identifying the punctuation mark from the set of punctuation marks based at least in part on the keyword.

23. The computer-implemented method of claim 21, wherein the punctuation mark is included in a set of punctuation marks, and wherein the computer-implemented method further comprises:

storing, in a data store, a set of unpunctuated words; and prior to generating the punctuated transcript, determining that the spoken word is not included in the set of unpunctuated words.

24. The computer-implemented method of claim 21, further comprising:
- associating the non-speech portion with a second word timing for a second spoken word included in the spoken words;
- generating a second punctuated transcript by including the punctuation mark with the second spoken word associated with the non-speech portion;
- receiving, from a natural language processing system, first intent data identifying a first semantic intent for the punctuated transcript;
- receiving, from the natural language processing system, second intent data identifying a second semantic intent for the second punctuated transcript; and
- determining that the first intent data more closely reflects a target semantic intent than the second intent data.

* * * * *